United States Patent
Bodtker

(10) Patent No.: US 9,670,965 B2
(45) Date of Patent: Jun. 6, 2017

(54) CENTERING MECHANISM ARRANGEMENT FOR DOUBLE CARDAN JOINTS

(71) Applicant: STEERING SOLUTIONS IP HOLDING CORPORATION, Saginaw, MI (US)

(72) Inventor: Joen C. Bodtker, Gaines, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 0 days.

(21) Appl. No.: 14/814,466

(22) Filed: Jul. 30, 2015

(65) Prior Publication Data
US 2017/0030417 A1  Feb. 2, 2017

(51) Int. Cl.
*F16D 3/33* (2006.01)
*F16D 3/32* (2006.01)

(52) U.S. Cl.
CPC .............. *F16D 3/33* (2013.01); *F16D 3/32* (2013.01); *Y10T 29/49826* (2015.01)

(58) Field of Classification Search
CPC ..................................... F16D 3/32; F16D 3/33
USPC ..................................... 464/114, 118; 29/428
See application file for complete search history.

(56) References Cited

U.S. PATENT DOCUMENTS

| | | | | |
|---|---|---|---|---|
| 2,133,176 A | * | 10/1938 | Parent | F16D 3/33 464/118 X |
| 2,208,314 A | * | 7/1940 | Snyder | F16D 3/68 |
| 3,057,174 A | * | 10/1962 | Folley | F16D 3/32 464/118 |
| 3,296,833 A | | 1/1967 | McCarthy | |
| 3,306,077 A | * | 2/1967 | Piatti | F16D 3/32 464/118 X |
| 3,792,597 A | * | 2/1974 | Orain | F16D 3/33 464/118 X |
| 4,436,515 A | * | 3/1984 | Mallet | F16D 3/32 464/114 |
| 5,525,110 A | | 6/1996 | Riccitelli et al. | |
| 2016/0003305 A1 | * | 1/2016 | Bonte | A01B 71/063 464/114 |
| 2016/0047424 A1 | * | 2/2016 | Bodtker | F16D 3/42 464/114 |

FOREIGN PATENT DOCUMENTS

| | | | | |
|---|---|---|---|---|
| GB | 377760 | * | 8/1932 | 464/118 |
| GB | 596945 | * | 1/1948 | 464/118 |

OTHER PUBLICATIONS

Universal Joint and Driveshaft Design Manual, Section 3.2.2., AE-7, Soiety of Automotive Engineers Inc., TJ1079.S62 1979.*

* cited by examiner

Primary Examiner — Gregory Binda
(74) Attorney, Agent, or Firm — Cantor Colburn LLP

(57) ABSTRACT

A joint assembly including a first yoke and a second yoke is provided. A sleeve is coupled to the first and second yokes and a centering device engages the ends of the first and second yokes. The centering device is configured to maintain the angular positions of the first and second yokes relative to one another, and is substantially fixed from rotation during rotation of the first and second yokes.

17 Claims, 3 Drawing Sheets ions. The foregoing and
CENTERING MECHANISM ARRANGEMENT FOR DOUBLE CARDAN JOINTS

FIELD OF THE INVENTION

The present disclosure generally relates to joints, and more specifically, to centering mechanisms for double universal or cardan joints.

BACKGROUND OF THE INVENTION

It may be desirable to communicate rotation between a first shaft and a second shaft extending away from one another at an angle. The first shaft can be a driving shaft and the second shaft can be a driven shaft. The shafts can be connected to one another with a single universal joint, an arrangement known as a Hooke joint. However, the driven shaft may not rotate at a uniform angular velocity. In particular, during revolution the driven shaft may experience angular acceleration and deceleration in response to relatively constant angular velocity of the driving shaft.

A cardan joint engages two shafts with respect to another with an intermediate, revolving coupling member. First and second universal joints connect the first and second shafts, respectively, to the intermediate coupling member. The cardan joint arrangement imparts constant velocity to the driven shaft. The cardan joint can include a centering plate positioned in the intermediate coupling member that engages both shaft ends to generally maintain the same output angle of the driven shaft as the input angle of the driving shaft with respect to the coupling member. The centering plate can define an aperture for receiving rounded ends of the shafts. Alternatively, the centering plate can define rounded projections receivable in an aperture defined by the shafts.

Use of cardan joints in high joint angle applications may require more space, which may increase size, cost, and friction. Accordingly, it is desirable to provide a simple double joint that can operate at high joint angles.

SUMMARY OF THE INVENTION

In one aspect of the invention, a joint assembly is provided. The joint assembly includes a first yoke having an end, a second yoke having an end, a sleeve coupled to the first and second yokes, and a centering device engaging the ends of the first and second yokes. The centering device is configured to maintain the angular positions of the first and second yokes relative to one another. The centering device is substantially fixed from rotation during rotation of the first and second yokes.

In another aspect of the invention, a double cardan joint is provided. The double cardan joint includes a driven yoke having an end, a driving yoke having an end, a first universal joint coupled to the driven yoke, a second universal joint coupled to the driving yoke, and a sleeve coupled to the first and second universal joints. The first and second universal joints are disposed within the sleeves and a centering device engaging the end of the driven yoke and the end of the driving yoke is provided. The centering device is configured to maintain the angular positions of the driven and driving yokes relative to one another. The centering device is substantially fixed from rotation during rotation of the driven and driving yokes.

In yet another aspect of the invention, a method of assembling a joint assembly is provided. The method includes providing a first yoke having an end, a second yoke having an end, providing a sleeve, rotatably coupling the first yoke and the second yoke to the sleeve, and providing a centering device engaging the ends of the first and second yokes. The centering device is configured to maintain the angular positions of the first and second yokes relative to one another, and is substantially fixed from rotation during rotation of the first and second yokes.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
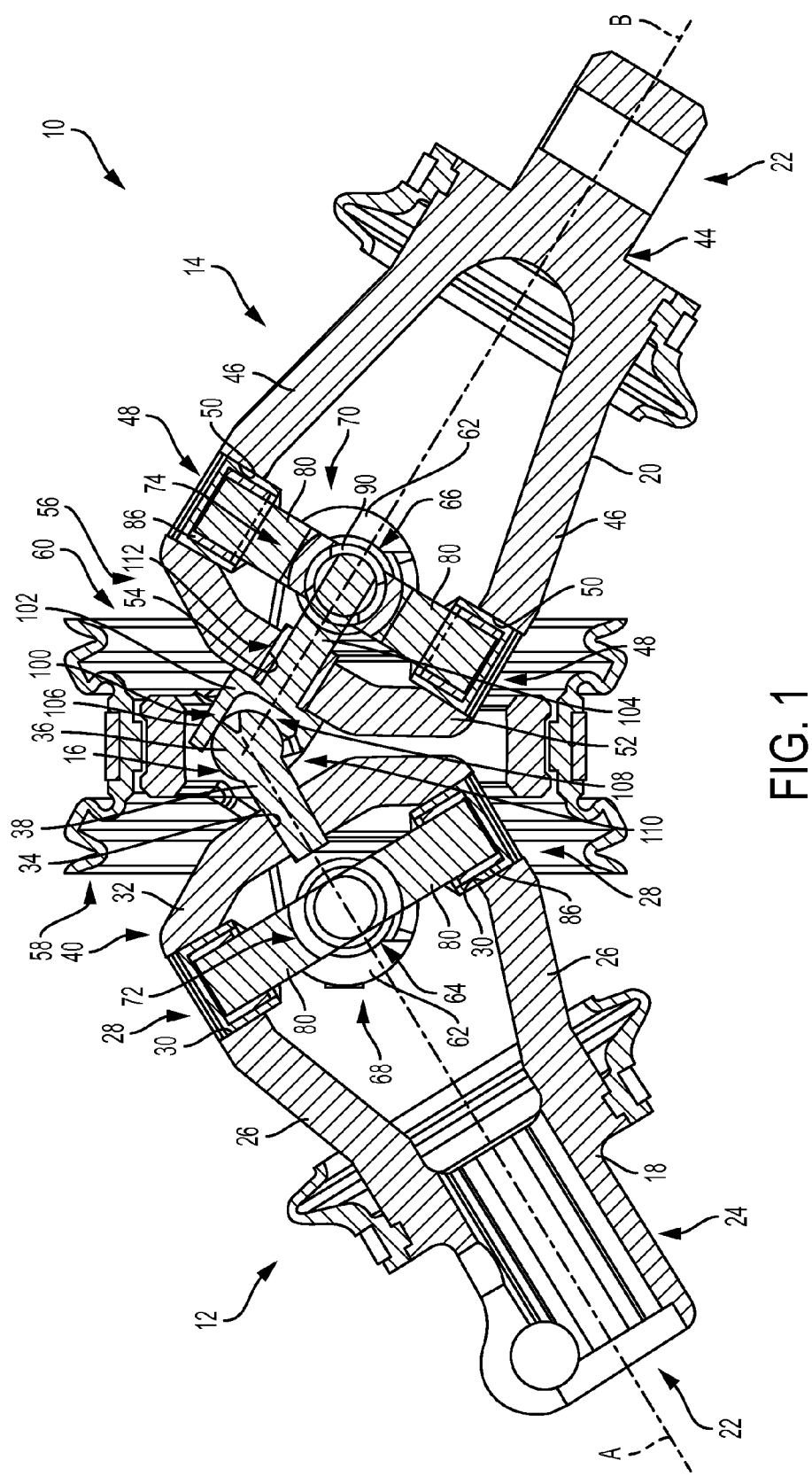
FIG. 1 is a cross-sectional view of an exemplary joint assembly.
Figure 2:
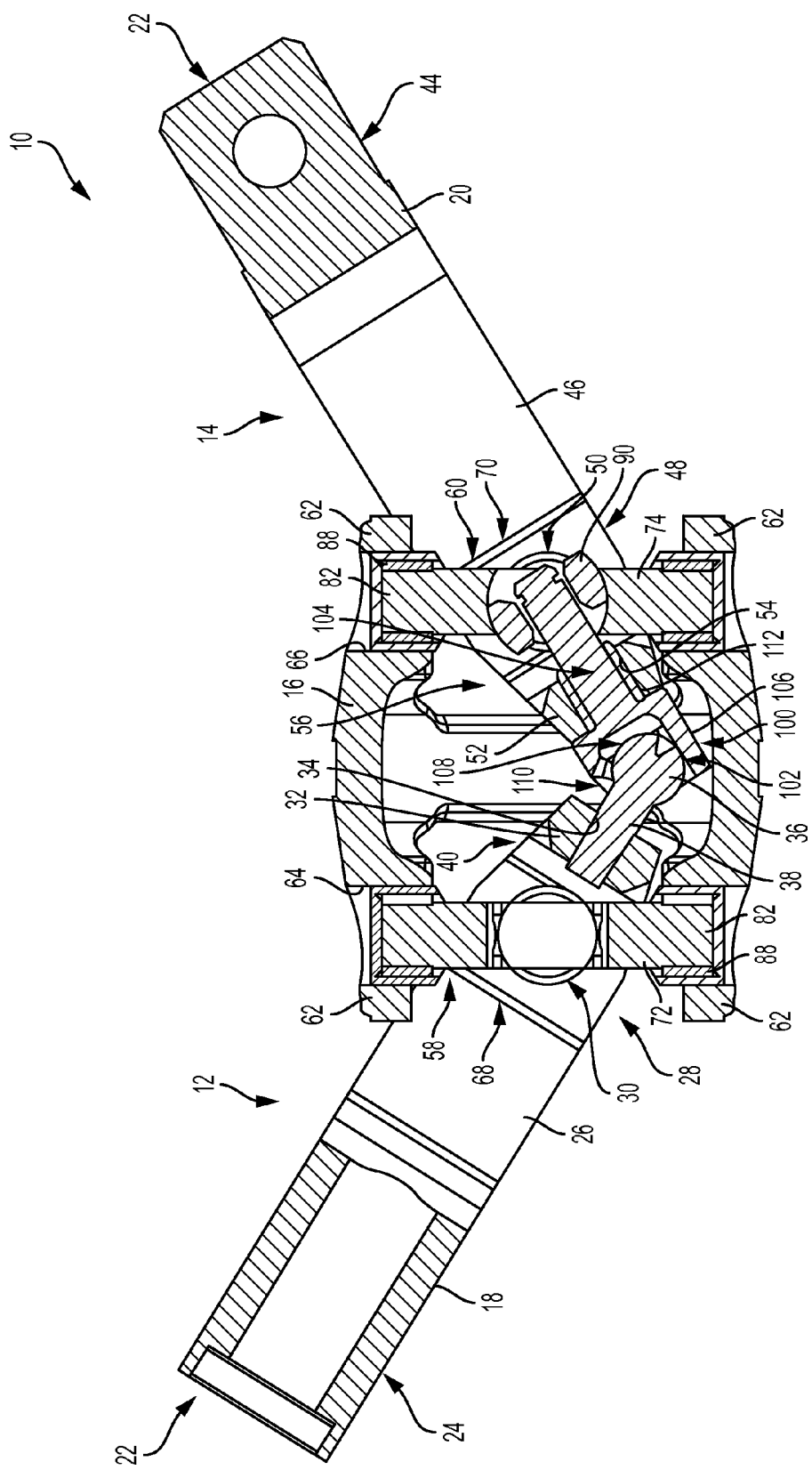
FIG. 2 is another cross-sectional view of the joint assembly shown in FIG. 1.

Referring now to the Figures, where the invention will be described with reference to specific embodiments, without limiting same, FIGS. 1 and 2 illustrate an exemplary constant velocity joint assembly 10 that generally includes a first yoke assembly 12 and a second yoke assembly 14 which are joined in an articulated, jointed manner by an outer housing or intermediate coupling member or sleeve 16. Torque from yoke assembly 12 is transmitted to second yoke assembly 14 through sleeve 16 through an angle. As explained herein, joint assembly 10 is capable of operating over a range of angles, but for a given application the effective angle between the respective axes of yoke assemblies 12, 14 can be fixed at a predetermined angle.

In the exemplary embodiment, constant velocity joint assembly 10 maintains constant velocity at a large joint angle, for example 43° to 83°, while reducing or eliminating any wobbling or lash between the components of joint assembly 10 that are subjected to torque and bending loads in operation. These considerations are achieved in a joint having a small package size.

As illustrated in FIGS. 1 and 2, yoke assemblies 12, 14 each have respective yokes 18, 20 that extend along respective axes 'A' and 'B'. Yokes 18, 20 are provided at axially outer ends with connecting features 22 which enable the free axial ends of yoke assemblies 12, 14 to be joined to respective driving and driven shafts (not shown) whose axes can be offset or misaligned at a predetermined, fixed angle (e.g., 63°±20°. In use, the predetermined angle is the angle that axes 'A', 'B' are fixed through the connection of yoke assemblies 12, 14 to the respective shafts (not shown). In this way, joint assembly 10 can operate as an intermediate shaft between the torque-transmitting drive and driven shafts mentioned above.

Yoke 18 includes a base shaft 24 with a pair of yoke ears 26 extending therefrom. Yoke ears 26 each include a distal end 28 having a receiving aperture 30 formed therein. A bridge 32 extends between yoke ear distal ends 28, and includes an aperture 34 formed therein. In the exemplary embodiment, bridge 32 is integrally formed with yoke ears 26. Alternatively, bridge 32 may be a separate component subsequently coupled to yoke ear distal ends 28. A ball stud 36 includes a shaft portion 38 that is inserted into bridge aperture 34 to couple ball stud 36 to yoke 18. As such, yoke 18 includes an axial inner end 40 configured to be disposed within sleeve 16.

Yoke 20 includes a base shaft 44 with a pair of yoke ears 46 extending therefrom. Yoke ears 46 each include a distal end 48 having a receiving aperture 50 formed therein. A bridge 52 extends between yoke ear distal ends 48, and includes an aperture 54 formed therein. In the exemplary embodiment, bridge 52 is integrally formed with yoke ears 46. Alternatively, bridge 52 may be a separate component subsequently coupled to yoke ear distal ends 48. As such, yoke 20 includes an axial inner end 56 configured to be disposed within sleeve 16.

Yoke inner ends 40, 56 are received within sleeve 16 through opposite open ends 58 and 60. In the exemplary embodiment, sleeve 16 includes a generally cylindrical, open-ended housing having two sets of opposed tabs 62 (FIG. 2). Each set of opposed tabs 62 includes respective axially aligned pin holes or openings 64 and 66 (see FIG. 2).

Figure 3A:
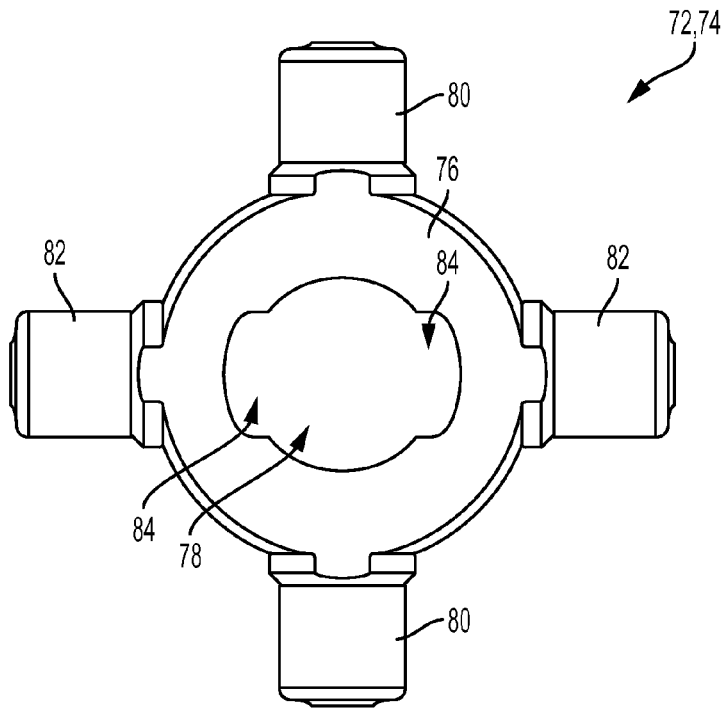
FIG. 3A is a side view of a portion of the joint assembly shown in FIGS. 1 and 2.
Figure 3B:
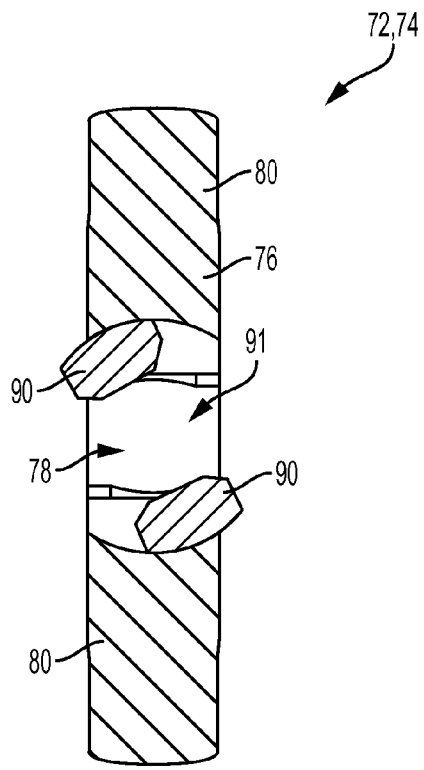
FIG. 3B is a cross-sectional view of the portion shown in FIG. 3A with an exemplary bearing.

As illustrated in FIGS. 1 and 2, yoke assembly 12 includes a universal joint 68, and yoke assembly 14 includes a universal joint 70. With further reference to FIGS. 3A and 3B, U-joint 68 includes a trunnion or spider 72, and u-joint 70 includes a trunnion or spider 74. Each spider 72, 74 includes a body 76 with a bearing aperture 78, a first set of opposed pins 80, and a second set of opposed pins 82. As shown in FIG. 3A, spiders 72, 74 may include opposed clearance grooves 84 to facilitate assembly of joint assembly 10, as described herein in more detail. As shown in FIG. 1, opposed pins 80 are configured for insertion into bearings 86 disposed within yoke receiving apertures 30 or 50. As shown in FIG. 2, opposed pins 82 are configured for insertion into bearings 88 disposed within sleeve pin openings 64 or 66. In the case of spider 74, bearing aperture 78 is configured to receive a bearing 90 (see FIGS. 2 and 3B), as is described herein in more detail.

In this manner, yokes 18, 20 are free to pivot in all directions relative to sleeve 16. In this way, joint assembly 10 is able to transmit torque between yoke assemblies 12, 14 and sleeve 16 through an angle between axes 'A', 'B' of yokes 18, 20.

Referring to FIGS. 1 and 2, yokes 18, 20 may be fixed relative to one another within sleeve 16. In this way, joint assembly 10 includes an attachment or centering device 100, which can maintain the angular positions of yokes 18, 20 relative to one another such that in operation, the output angle of the joint is the same as that of the input angle through yoke assemblies 12, 14 relative to sleeve 16. At other joint angles (e.g., deviations from the nominal joint angle), the input angle and output angle relative to sleeve 16 may differ.

In the exemplary embodiment, centering device 100 generally includes a socket portion 102 and a shaft portion 104. Socket portion 102 includes an outer wall 106 defining a receiving socket 108, and a slot 110 formed in outer wall 106. Receiving socket 108 is configured to receive ball stud 36, and slot 110 is configured to allow ball stud shaft portion 38 to translate therein, which enables angular adjustment between first yoke 18 and second yoke 20.

Centering device shaft portion 104 extends into aperture 54 formed in bridge 52, which may include a bushing 112, a rolling element bearing (not shown), or the like. Shaft portion 104 further extends into and is supported by bearing 90 disposed in spider bearing aperture 78. In the exemplary embodiment, bearing 90 is a spherical, compound pivotable bearing. Bearing 90 is free to universally pivot inside spider 74. Bearing 90 includes a cross aperture or bore 91 (see FIG. 3B) to allow placement of socket shaft 104, and may include parallel flats or truncations to allow assembly into clearance recess 84. Bearing aperture 78 allows bearing 90 to orient its bore axis according to an axis (along axis 'B') of shaft portion 104.

Clearance grooves 84 allow assembly of bearing 90 to spider 74 without additional retention hardware. Spherical bearing 90 is inserted into clearance grooves 84 and when male and female spherical centers are in alignment, bearing 90 is twisted into the assembled condition. Alternatively, bearing 90 may be a cylindrical bearing having a snap-fit or a secondary retaining element to maintain its position.

As such, centering device 100 is rotatable about axis 'B' within aperture 54 and bushing 112. A biasing mechanism (not shown) such as a spring may be optionally disposed within receiving socket 108 between ball stud 36 and the inside of receiving socket 108 to axially bias centering device 100 into yoke 20.

Centering device 100 is rotatable with respect to second yoke 20. As such, as the joint rotates at a given joint angle, centering device 100 stays fixed or substantially fixed in place while ball stud 36 spins inside socket portion 102 in concert with first yoke 18.

A method of assembling joint assembly 10 includes providing yokes 18, 20, providing universal joints 68, 70, providing sleeve 16, and providing centering device 100. Universal joints 68, 70 are rotatably coupled to the sleeve 16 and to respective yokes 18, 20 such that universal joints 68, 70 are disposed at least partially within sleeve 16. Centering device 100 is positioned to engage yoke ends 40, 56 to maintain the angular positions of yokes 18, 20 relative to one another. During rotation of yokes 18, 20, centering device 100 is fixed or substantially fixed from rotation relative to yokes 18, 20, and therefore must be free to allow yoke 20 to rotate with respect to centering device 100.

Described herein are systems and method for a double joint assembly. In one embodiment, the double joint assembly may be a double cardan joint or universal joint. The joint assembly includes a centering device that couples first and second rotating yokes and maintains the relative angular positions therebetween. The centering device is disposed within the second yoke, which rotates relative thereto, and the first yoke is rotatable within the centering device. The centering device remains fixed in space while rotary motion is transferred from one yoke to the other. As such, the joint assembly maintains the simplicity of lower joint angles used in a single ball and socket pair while operating at constant velocity at higher joint angles without requiring more space.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A joint assembly comprising:
   a first yoke having a first yoke axis and a first end, the first yoke includes a pair of first yoke ears each having a distal end, and a first bridge coupled between the distal ends of the first yoke ears proximate the first end;
   a second yoke having a second yoke axis and a second end, the second yoke includes a pair of second yoke ears each having a distal end, and a second bridge coupled between the distal ends of the second yoke ears proximate the second end;
   a sleeve coupled to the first and second yokes;
   a first spider coupled between the first yoke and the sleeve;
   a second spider coupled between the second yoke and the sleeve; and
   a centering device engaging the ends of the first and second yokes, the centering device configured to maintain the angular positions of the first and second yokes relative to one another, the centering device rotatably coupled to the second bridge and the second spider along the second yoke axis, the centering device configured to be substantially fixed from rotation relative to the first yoke and second yoke during rotation of the first and second yokes.

2. The joint assembly of claim 1, wherein the first spider includes a first set of opposed pins and a second set of opposed pins, wherein the first set of opposed pins is rotatably coupled to the sleeve, and the second set of opposed pins is rotatably coupled to the first yoke ears.

3. The joint assembly of claim 1, further comprising a ball stud fixedly coupled to the first bridge.

4. The joint assembly of claim 3, wherein the ball stud includes a shaft portion that extends along the first yoke axis, and the first bridge includes an aperture to fixedly receive the shaft portion.

5. The joint assembly of claim 1, wherein the centering device includes a socket portion configured to receive the ball stud and a shaft portion that extends along the second yoke axis, and the second bridge includes an aperture to rotatably receive the centering device shaft portion.

6. The joint assembly of claim 5, further comprising a bushing disposed in the second bridge aperture, the centering device shaft portion rotatably disposed within the bushing to facilitate rotation of the second yoke about the centering device.

7. The joint assembly of claim 5, wherein the socket portion comprises an outer wall defining a receiving socket to receive the ball stud, the outer wall including a slot formed therein to accept a shaft of the ball stud.

8. The joint assembly of claim 5, wherein the second spider includes a bearing aperture that is disposed about the second yoke axis, and wherein a bearing is disposed in the bearing aperture and the shaft portion of the centering device is rotatably disposed within a bore of the bearing.

9. The joint assembly of claim 8, wherein the bearing is a spherical bearing.

10. The joint assembly of claim 1, wherein the first yoke axis and the second yoke axis are oriented at an angle relative to one another, the angle being between approximately 43° and approximately 83°.

11. A double cardan joint comprising:
   a first yoke having a first yoke axis and a first end, the first yoke includes a pair of first yoke ears each having a distal end, and a first bridge coupled between the distal ends of the first yoke ears proximate the first end;
   a second yoke having a second yoke axis and a second end, the second yoke includes a pair of second yoke ears each having a distal end, and a second bridge coupled between the distal ends of the second yoke ears proximate the second end;
   a first universal joint comprising a first spider coupled to the first yoke;
   a second universal joint comprising a second spider coupled to the second yoke;
   a sleeve coupled to the first and second universal joints, the first and second universal joints disposed within the sleeve; and
   a centering device engaging the first end of the first yoke and the second end of the second yoke, the centering device configured to maintain the angular positions of the first and second yokes relative to one another, the centering device rotatably coupled to the second bridge and the spider along the second yoke axis, the centering device configured to be substantially fixed from rotation relative to the first and second yokes during rotation of the first and second yokes.

12. The double cardan joint of claim 11, further comprising:
   a first set of bearing pins projecting from the first universal joint into the sleeve; and
   a second set of bearing pins projecting from the second universal joint into the sleeve, the first and second set of bearings pins establishing a jointed connection between the first and second universal joints and the sleeve for rotation of the sleeve in response to rotation of the first and second universal joints about their respective axes.

13. The double cardan joint of claim 12, wherein the first yoke end comprises a ball stud, and the second bridge comprises a yoke bridge aperture to rotatably receive a portion of the centering device.

14. The double cardan joint of claim 13, wherein the centering device comprises a socket portion to receive the ball stud and a shaft portion that extends along the second yoke axis into the yoke bridge aperture of the second yoke, the socket portion having an outer wall defining a receiving socket to receive the ball stud, the outer wall including a slot formed therein to accept a shaft portion of the ball stud.

15. The double cardan joint of claim 14, further comprising a bushing disposed in the yoke bridge aperture, the centering device shaft portion rotatably disposed within the bushing to facilitate rotation of the second yoke about the centering device.

16. The double cardan joint of claim 15, wherein the second spider includes a bearing aperture that is disposed about the second yoke axis, and wherein a spherical bearing is disposed in the bearing aperture and the shaft portion of the centering device is rotatably disposed within a bore of the spherical bearing.

17. A method of assembling a joint assembly, the method comprising:
   providing a first yoke having a first yoke axis and a first end, the first yoke includes a pair of first yoke ears each having a distal end, and a first bridge coupled between the distal ends of the first yoke ears proximate the first end;
   providing a second yoke having a second yoke axis and a second end;
   providing a sleeve coupled to the first and second yokes;
   providing a first spider coupled between the first yoke and the sleeve;

providing a second spider coupled between the second yoke and the sleeve; and providing a centering device engaging the ends of the first and second yokes, the centering device configured to maintain the angular positions of the first and second yokes relative to one another, the centering device rotatably coupled to the second bridge and the second spider along the second yoke axis, the centering device configured to be substantially fixed from rotation relative to the first yoke and second yoke during rotation of the first and second yokes.

* * * * *